(12) United States Patent
Ferrarese et al.

(10) Patent No.: US 11,241,938 B2
(45) Date of Patent: Feb. 8, 2022

(54) AIR-CONDITIONING DEVICE FOR A VEHICLE COMPRISING AN ARTICULATED FLAP

(71) Applicant: DENSO THERMAL SYSTEMS S.p.A., Turin (IT)

(72) Inventors: Claudio Ferrarese, Turin (IT); Andrea Carbone, Turin (IT)

(73) Assignee: DENSO THERMAL SYSTEMS S.P.A., Poirino (IT)

( * ) Notice: Subject to any disclaimer, the term of this patent is extended or adjusted under 35 U.S.C. 154(b) by 310 days.

(21) Appl. No.: 16/595,225

(22) Filed: Oct. 7, 2019

(65) Prior Publication Data
US 2020/0108696 A1 Apr. 9, 2020

(30) Foreign Application Priority Data
Oct. 8, 2018 (IT) .......................... 102018000009225

(51) Int. Cl.
*B60H 1/00* (2006.01)

(52) U.S. Cl.
CPC ..... *B60H 1/00871* (2013.01); *B60H 1/00485* (2013.01); *B60H 1/00564* (2013.01); *B60H 1/00678* (2013.01)

(58) Field of Classification Search
CPC ............ B60H 1/00871; B60H 1/00835; B60H 1/00564; B60H 1/00678; B60H 1/00485
See application file for complete search history.

(56) References Cited

U.S. PATENT DOCUMENTS

| | | | | |
|---|---|---|---|---|
| 6,231,437 B1* | 5/2001 | Loup | ................. | B60H 1/00671 454/156 |
| 6,463,998 B1* | 10/2002 | Shindo | ............... | B60H 1/00028 165/204 |
| 7,954,540 B2* | 6/2011 | Hoehn | ................. | B60H 1/0005 165/42 |
| 9,919,576 B2* | 3/2018 | Kim | .................... | B60H 1/00057 |

FOREIGN PATENT DOCUMENTS

| | | |
|---|---|---|
| DE | 102010052259 A1 | 5/2012 |
| FR | 2783755 A1 | 3/2000 |

OTHER PUBLICATIONS

Italian Search Report for IT Application No. 102018000009225, dated Jun. 13, 2019, 7 pages. No English translation available.

\* cited by examiner

*Primary Examiner* — Marc E Norman
(74) *Attorney, Agent, or Firm* — Armstrong Teasdale LLP

(57) ABSTRACT

Described herein is a heating and/or air-conditioning device for a motor vehicle, the device including an inlet duct for the supply of fresh air, an air transmission branch, and an air heating branch, both supplied by the inlet duct and communicating with each other via a mixing zone. A butterfly flap is mounted pivotably around a rotation axis located at the mixing zone. The butterfly flap comprises a first wing associated with a first branch and a second wing associated with a second branch, as well as a wing extension elastically hinged to the first wing according to a hinge axis parallel to the rotation axis of the butterfly flap. Within the first branch are arranged abutment formations suitable to be engaged by the wing extension and to induce, during a rotation of the butterfly flap, a rotation of the wing extension with respect to the first wing.

6 Claims, 4 Drawing Sheets

AIR-CONDITIONING DEVICE FOR A VEHICLE COMPRISING AN ARTICULATED FLAP

CROSS-REFERENCE TO RELATED APPLICATIONS

This application claims the benefit of priority to Italian Patent Application No. 102018000009225, filed Oct. 8, 2018, the entire contents of which are hereby incorporated by reference herein.

FIELD OF THE INVENTION

The present invention refers to an air conditioning device for a vehicle, comprising an inlet duct for supplying fresh air, an air transmission branch and an air heating branch, both supplied by the inlet duct and communicating with each other through a mixing zone, and mixing means arranged at the mixing zone for distributing an air flow between the air transmission branch and the air heating branch, wherein said mixing means are movable between an extreme hot position in which the mixing means prevent communication between the air transmission branch and the mixing zone and force the air flow to pass through the air heating branch, an extreme cold position in which the mixing means prevent communication between the air heating branch and the mixing zone and force the air flow to pass through the air transmission branch, and an extreme closed position in which the mixing means prevent communication between the mixing zone and both the air transmission branch and the air heating branch.

BACKGROUND

Devices of this type are known, wherein the mixing means are made up of a set of flaps of various shapes, coordinated in their movement so as to achieve the extreme positions indicated above as well as the intermediate positions.

In known devices of this type, the inlet duct is supplied by a flow of air driven by a fan, which in turn is supplied by a flow of outside air taken from outside the cabin of the vehicle and/or by a flow of recirculating air taken from inside the cabin.

The mixing zone of the device is connected to distribution means that allow the air flow thus treated to be distributed among different outlets opening into the cabin.

One of the drawbacks of such devices is that the butterfly flap imposes a very convoluted path on the heated air, and results in a sub-optimal hot air supply to the next upper distribution zone. To overcome this drawback, it is known to introduce a deflector ("chimney") at the mixing zone to divert a vein of hot air towards the distribution zone intended for the defrosting function. However, this leads to the unwanted introduction of an obstacle in the airflow path.

Another drawback is that, in order to optimize the molding processes and reduce the material used, the air heating branch is normally separated from the lower distribution duct (dedicated to the foot area) by a single, thin wall of plastic material. As a result, a relatively bulky formation ("rostrum") must be formed at the free end of this wall to ensure the abutment of both the butterfly flap and the flap dedicated to the lower distribution duct. The volume of the "rostrum" negatively affects the fluid dynamic performance of the device.

BRIEF DESCRIPTION

One object of the present invention is to make available an air conditioning device comprising a reduced number of moving parts to be controlled. A reduction in the number of moving parts could lead to a simplification of the device, with subsequent effects in terms of reduced manufacturing costs and improved performance.

This object is achieved according to the invention by a device of the type defined at the beginning wherein said mixing means comprise a butterfly flap pivotably mounted about a rotation axis arranged at the mixing zone, said butterfly flap comprising a first wing associated with one of said air transmission and air heating branches, hereinafter first branch, and a second wing associated with the other of said air transmission and air heating branches, hereinafter second branch, as well as a wing extension elastically hinged to said first wing according to a hinge axis parallel to the rotation axis of the butterfly flap, wherein within the first branch there are arranged abutment means, adapted to be engaged by the wing extension and to cause, during rotation of the butterfly flap, the wing extension to rotate relative to the first wing, wherein in said extreme closed position the wing extension prevents communication between the first branch and the mixing zone and the second wing prevents communication between the second branch and the mixing zone.

In a device according to such an idea of a solution, the extreme positions of heat, cold and closure may be achieved simply through the three components of the butterfly flap. In addition to mixing hot and cold air, the butterfly flap alone may completely close the air outlet duct (by closing the first and second branches), without requiring other devices. The wing extension of the butterfly flap does not require any dedicated mechanism for the movement thereof. It is therefore clear that this is a simplification compared to known systems wherein the mixing group provided for more than one flap with the respective actuators and/or drive mechanisms.

Preferred embodiments of the invention are defined in the dependent claims, which are intended as an integral part of the present description.

BRIEF DESCRIPTION OF THE FIGURES

Further features and advantages of the device according to the invention will become more apparent in the following detailed description of an embodiment of the invention, made with reference to the accompanying drawings, provided purely to be illustrative and non-limiting, wherein.

DETAILED DESCRIPTION

Figure 1:
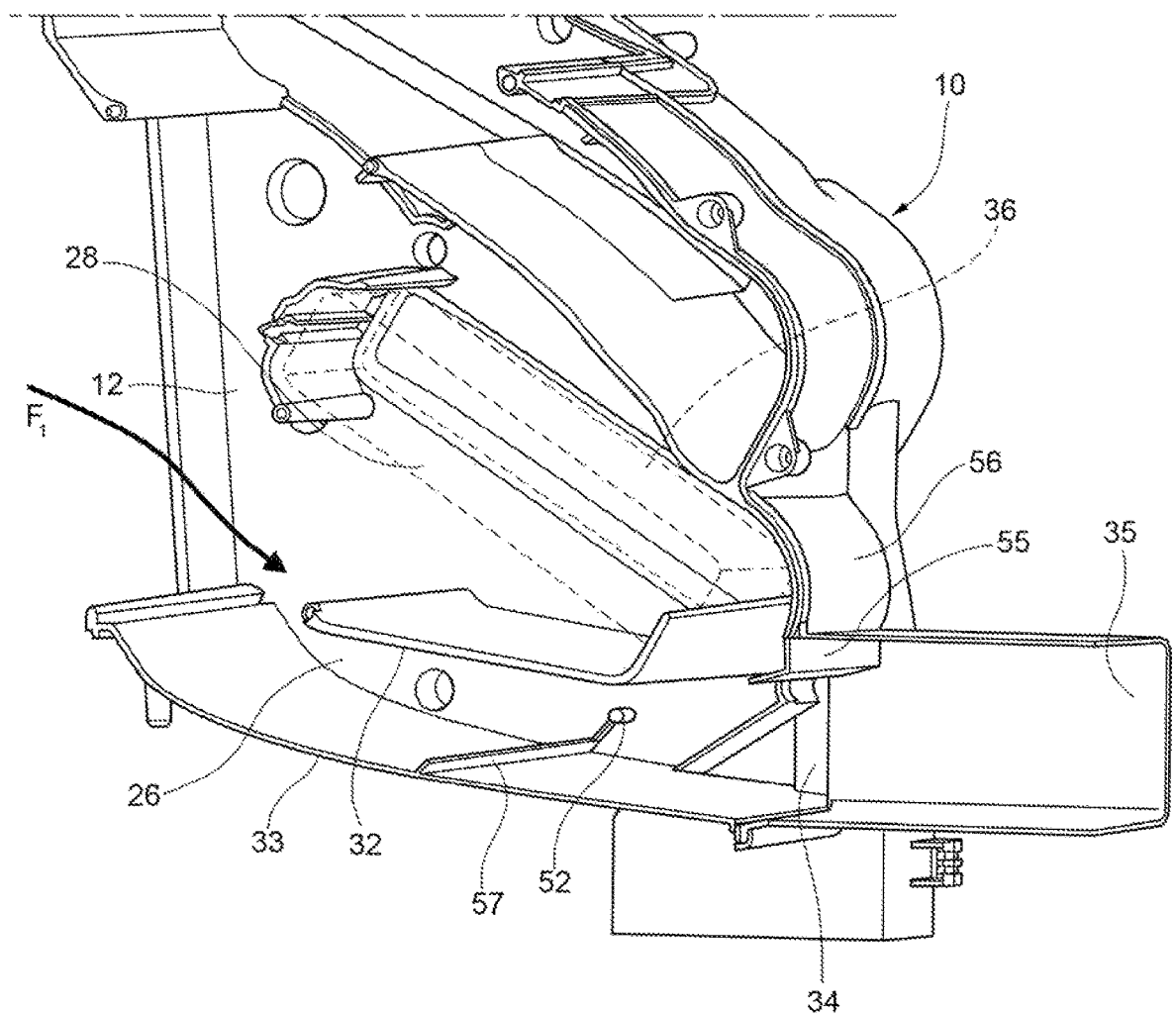
FIG. 1 is a schematic cutaway view of an air conditioning device according to the invention.
Figures 2, 3:
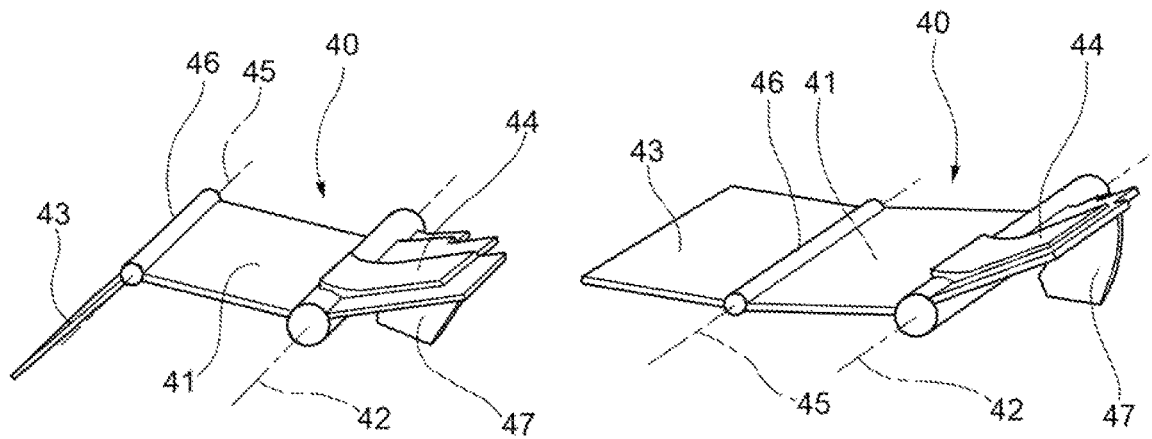
FIGS. 2 and 3 are perspective views of an articulated flap for the device in FIG. 1, in two different operating positions.

The device shown in the figures comprises a casing 10 generally made of plastic material and delimiting an inlet duct 12 adapted to be supplied by a flow of fresh air (arrow $F_1$) pushed by a fan (not shown). The latter is in turn fed by a flow of outside air taken from outside of the cabin of the vehicle, or by a flow of recirculating air taken from inside of the cabin. In the example shown, this is an air conditioning device configured to supply air to the rear seats of the cabin of a motor vehicle. It is understood, however, that the invention is not limited to this specific application.

An evaporator (not shown) connected to a conventional air conditioning circuit may be housed transversely in the inlet duct 12 in order to produce an air flow at the outlet that may be conditioned if the evaporator is active.

Downstream, the inlet duct 12 branches off on one side into an air transmission branch 26 and on the other into an air heating branch 28. The air heating branch 28 is separated from the air transmission branch 26 by an inner partition 32 of the casing 10. The transmission branch 26 is delimited internally by the inner partition 32, and externally by an outer wall 33 of the casing 10. The branches 26 and 28 converge in a mixing zone 34 arranged downstream. The arrangement of the various ducts in the casing 10 may differ from that which is described above.

In the heating branch 28 a heater 36, simply sketched in the figures, is housed.

The mixing zone 34 communicates with one or more distribution ducts that supply the respective nozzles (not shown) located in various parts of the cabin of the motor vehicle. These ducts may be associated with flaps or other types of distribution members (not shown) for the distribution of the treated air obtained in the mixing zone between the various distribution ducts. One of these distribution ducts is visible in the figures and indicated at 35.

A mixing flap 40 (visible in FIGS. 2-8) is mounted in the casing 10 and is arranged in the mixing zone 34 at the confluence of the air transmission branch 26 and the air heating branch 28. The mixing flap 40 is a butterfly type flap mounted pivotably around an axis 42 arranged near or at the inner partition 32. The butterfly flap 40 comprises a first wing 41 associated with the air transmission branch 26 and a second wing 44 associated with a heating branch (28), as well as a wing extension 43 elastically hinged to the first wing 41 according to a hinge axis 45 parallel to the rotation axis 42 of the butterfly flap 40.

Preferably, the butterfly flap 40, comprising the first and second wing, is made as a single piece of plastic material. The wing extension 43 may be made as a piece of plastic material connected to the first wing 41 by means of a hinge 46 made of elastomeric material. The butterfly flap with its wing extension may be made by means of a bi-injection molding process. The first wing 41 and the second wing 44 form with each other an angle of less than 180° relative to the rotation axis 42 of the butterfly flap 40.

In the example shown, on the second wing 44 there is arranged a protrusion 47 provided for coupling to an actuating mechanism (not shown) to control the movement of the butterfly flap. The way in which the butterfly flap 40 is coupled to an actuating mechanism or actuator is not essential to the present invention.

Inside the air transmission branch 26 and near the inner partition 32 is arranged a first abutment formation 51, visible in FIGS. 4-8. This abutment formation 51 may be obtained in the form of a peg placed on a wall of the air transmission branch 26 that interconnects the inner partition 32 and the outer wall 33. The function of this first abutment formation will be clarified hereinafter.

Within the air transmission branch 26 and near the outer wall 33 there is further provided a second abutment formation 52. This abutment formation 52 may also be obtained in the form of a peg arranged on the wall of the air transmission branch 26 that interconnects the inner partition 32 and the outer wall 33. The function of this second abutment formation will be clarified hereinafter.

According to an alternative embodiment not illustrated, the wing extension could be connected to the second wing of the butterfly flap and the abutment formations could be arranged within the air heating branch.

The butterfly flap 40 is adapted to oscillate between three extreme positions:
- an extreme heat position (shown in FIG. 4), wherein the first wing 41 prevents the communication between the air transmission branch 26 and the mixing zone 34. In this position, the end of the first wing 41 equipped with the elastomeric hinge 46 is in abutment against the outer wall 33 of the air transmission branch 26;
- an extreme cold position (shown in FIG. 7), wherein the second wing 44 prevents the communication between the air heating branch 28 and the mixing zone 34. In this position, the end of the second wing 44 is in abutment, by means of a flexible lip 44a (for example made of elastomeric material) obtained on the end of the second wing (shown in FIGS. 7 and 8), against a formation 55 obtained near a wall 56 of the air heating branch 28 opposite to the inner partition 32;
- an extreme closing position (shown in FIG. 8) wherein the second wing 44 continues to prevent communication between the air heating branch 28 and the mixing zone 34 as in the extreme cold position, due to the deformability of the flexible lip 44a, and wherein the wing extension 43 prevents communication between the air transmission branch 26 and the mixing zone 34.

Figure 4:
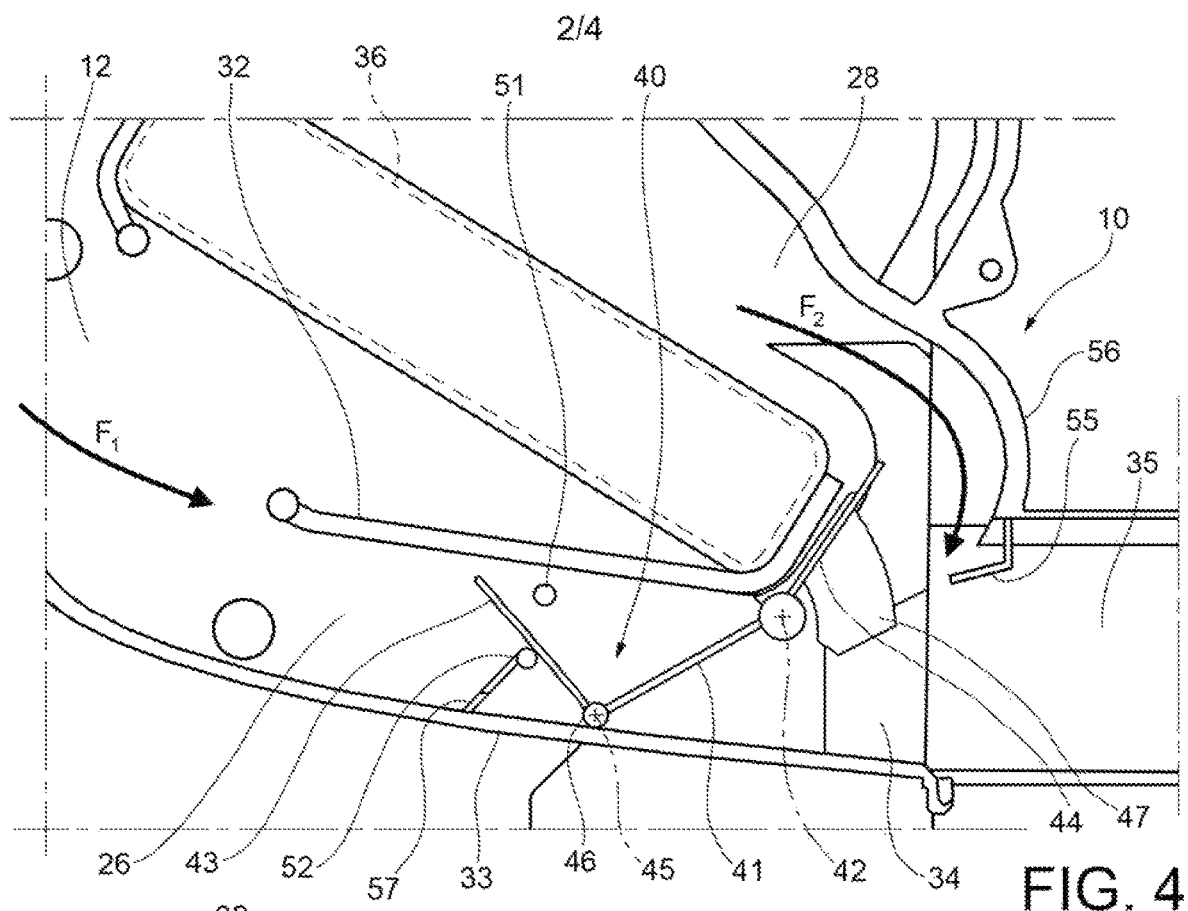
FIGS. 4 to 8 are sectional views of the device in FIG. 1, with the flap of FIGS. 2 and 3 in different operating positions.

With reference to the extreme heat position shown in FIG. 4, the butterfly flap 40 is in an angular position in which the first wing 41 engages the outer wall 33 of the air transmission branch 26, closing the air transmission branch 26, and the second wing 44 is in abutment against the inner partition 32, obtaining the maximum possible opening for the outflow of the air heating branch 28. The air flow that arrives in the mixing zone 34 thus passes exclusively through the air heating branch 28, as indicated by the arrow $F_2$ in FIG. 4. The wing extension 43 is in abutment against the second abutment formation 52 and is held against it by virtue of the elastic force exerted by the elastomeric hinge 46 that connects it to the first wing 41.

Figure 5:
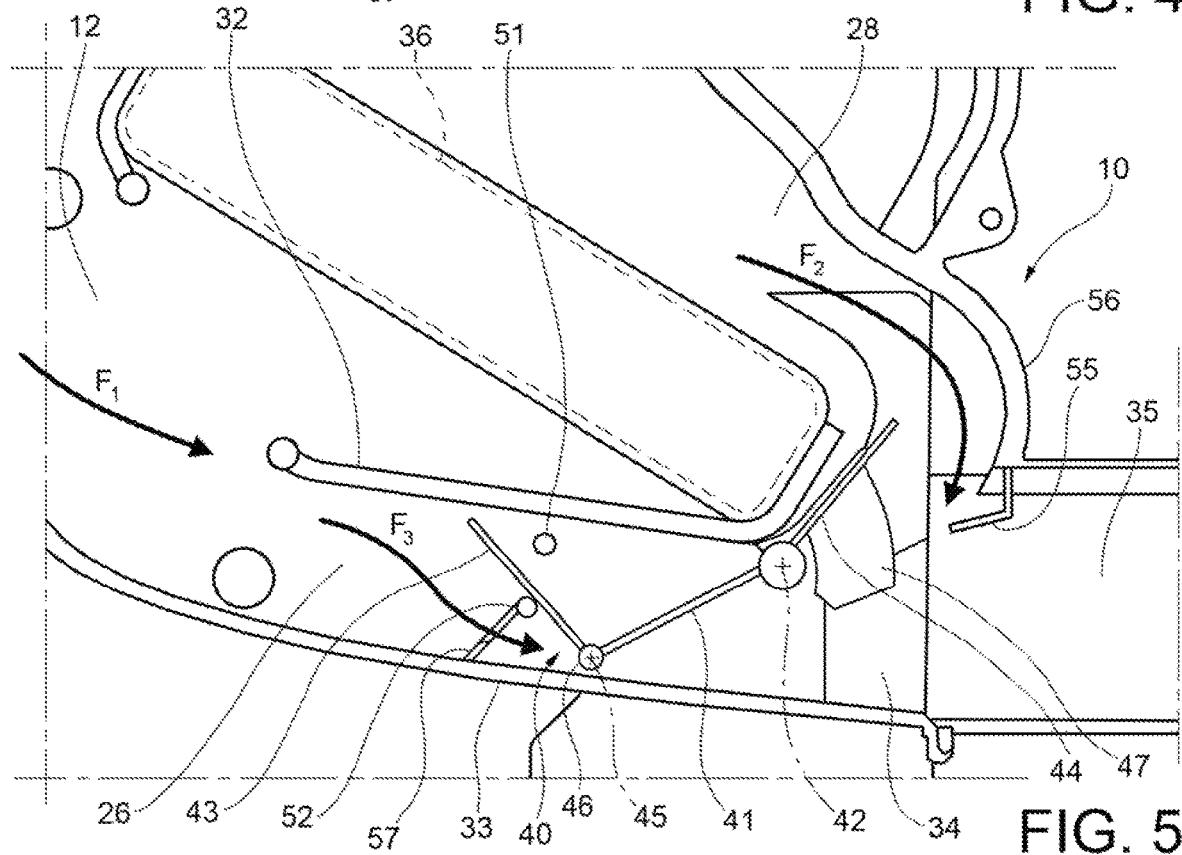
Figure 6:
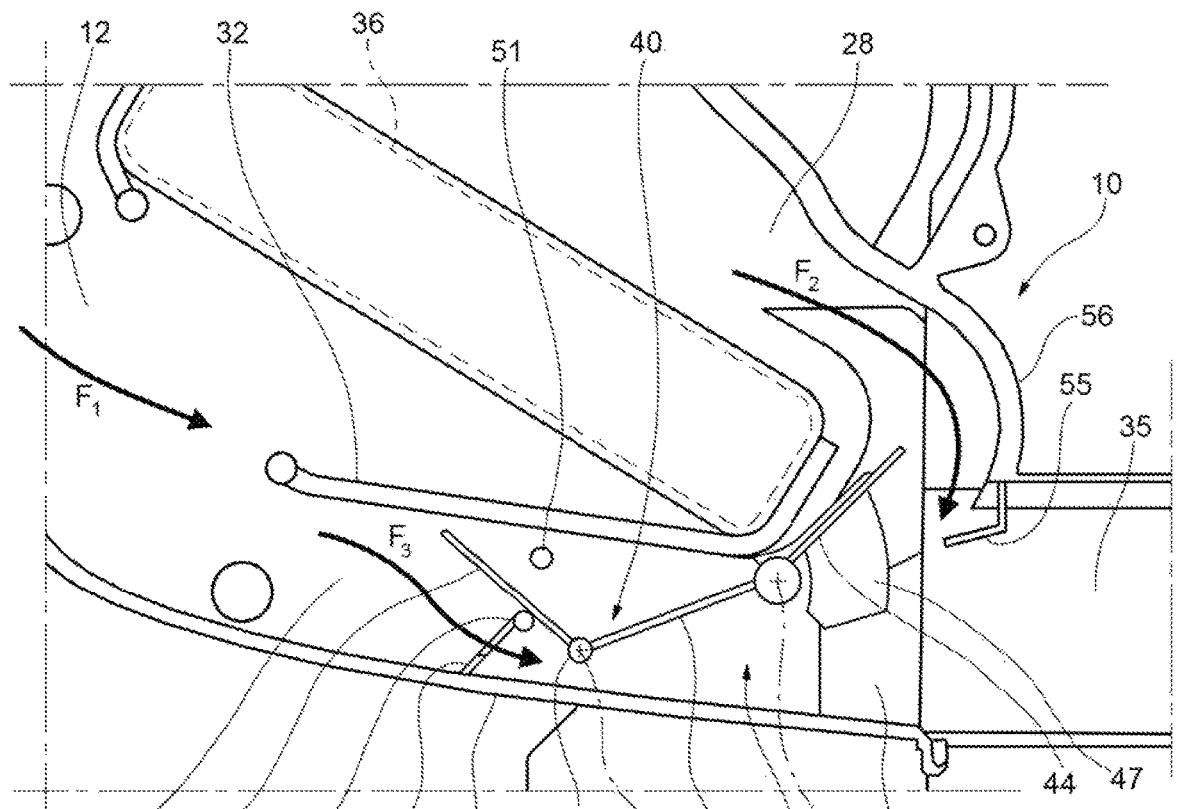

With reference to FIGS. 5 and 6, the butterfly flap 40 has been rotated (clockwise in the figures) to two successive angular positions starting from the extreme hot position of FIG. 4. In these positions the first wing 41 progressively moves away from the outer wall 33 of the air transmission branch 26, while the second wing 44 progressively approaches the formation 55 obtained near the wall 56 of the air heating branch 28. Thus, an air flow is also obtained through the air transmission branch 26, indicated at $F_3$ in FIGS. 5 and 6, which mixes in the mixing zone 34 with the air flow $F_2$ of the air heating branch 28 with different proportions between FIG. 5 and FIG. 6. The wing extension 43 in abutment against the second abutment formation 52 is pulled by the butterfly flap 40 and rotates progressively with respect to the first wing 41, around the hinge axis 45, towards a resting position in which the wing extension 43 is approximately aligned with the first wing 41 (represented in FIGS. 3 and 7).

Figure 7:
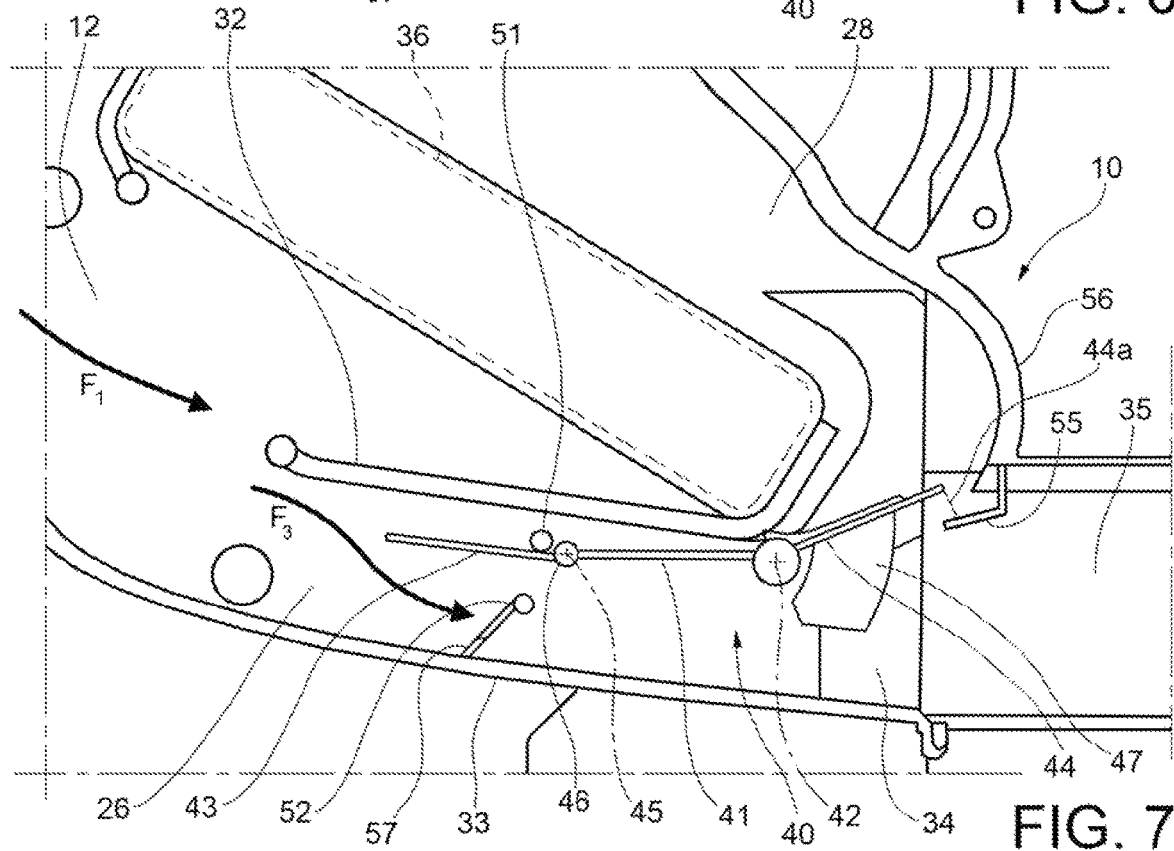

With reference to FIG. 7, the butterfly flap 40 has been further rotated (clockwise in the figures) into the angular position corresponding to the extreme cold position. In this position the first wing 41 has moved further away from the outer wall 33 of the air transmission branch 26. In the meantime, the wing extension 43, pulled by the butterfly flap

40, has moved away from the second abutment formation 52 and has been brought into abutment against the first abutment formation 51. If the butterfly flap 40 is further rotated, the butterfly flap 40 starts rotating again with respect to the first wing 41, but with a torque of the elastic force of the hinge 46 oriented in the opposite direction with respect to that which occurred in passing from the position of FIG. 4 to the position of FIG. 7. In the meantime, the second wing 44 has moved against the formation 55 obtained near the wall 56 of the air heating branch 28, interrupting the passage of the air flow in the air heating branch 28. Therefore, an air flow is achieved only through the air transmission branch 26, indicated at $F_3$ in FIG. 7.

Figure 8:
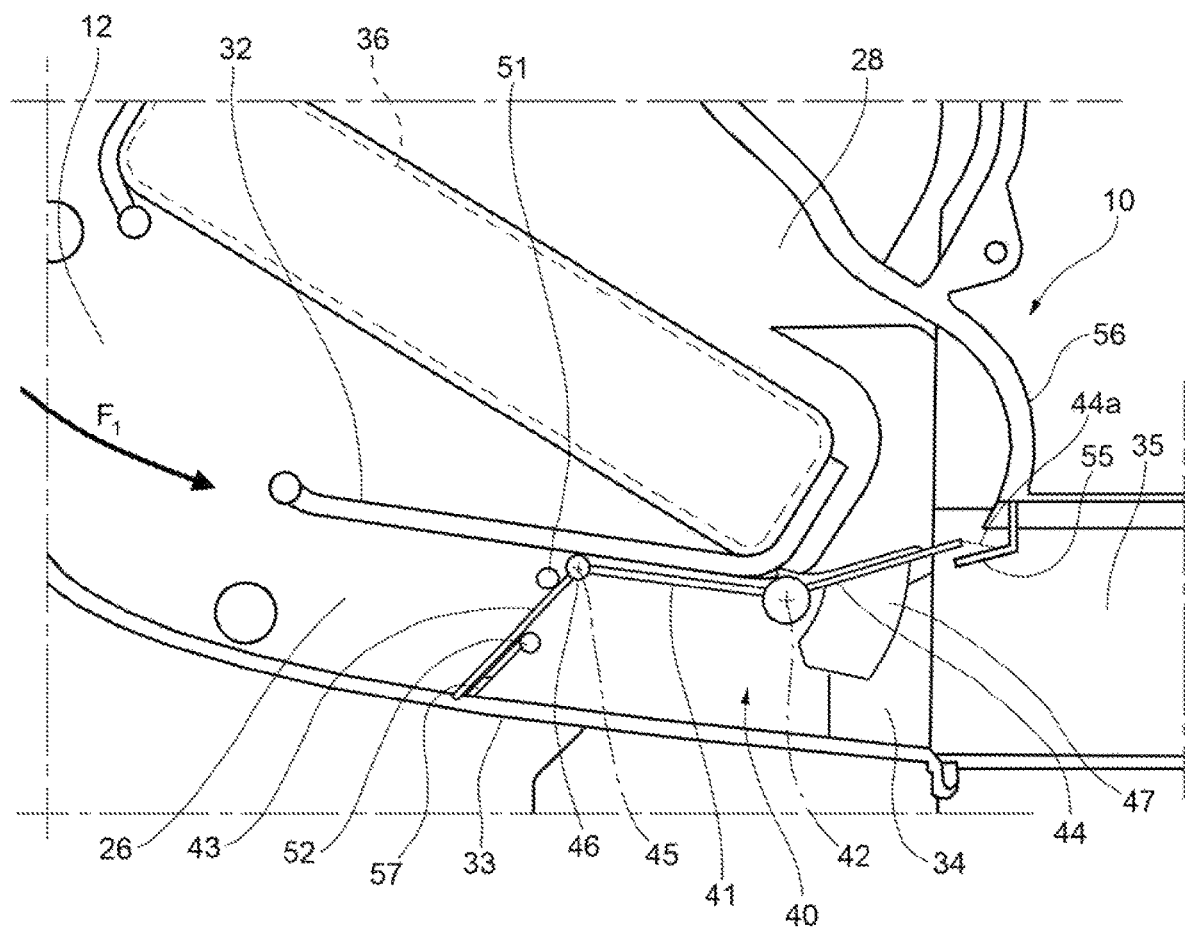

With reference to FIG. 8, the butterfly flap 40 has been further rotated (clockwise in the figures) into the angular position corresponding to the extreme closing position. In this position the first wing 41 has moved further away from the outer wall 33 of the air transmission branch 26. In the meantime, the wing extension 43, pulled by the butterfly flap 40 and in abutment against the first abutment formation 51, has been rotated further until the free end thereof has been brought against the outer wall 33 of the air transmission branch 26 or, more precisely, against a support 57 obtained on this outer wall 33, while the elastomeric hinge 46 has been brought against the inner partition 32. In this way the wing extension 43 interrupts the air flow passage of the air transmission branch 26. In the meantime, the second wing 44 has continued to maintain its abutment against the formation 55 obtained near the wall 56 of the air heating branch 28, due to the deformability of the flexible lip 44a thereof.

The change from the position of FIG. 7 to the position of FIG. 8 may be achieved by rotating the butterfly flap 40 by a few degrees. However, by adequately sizing the position of the first abutment formation 51 and the hinge axis 45, it is possible to obtain a significantly greater rotation of the wing extension 43 with respect to the first wing 41.

The invention claimed is:

1. An air conditioning device for a vehicle, the device comprising an inlet duct for supplying fresh air, an air transmission branch, and an air heating branch both supplied by the inlet duct and communicating with each other through a mixing zone, and mixing means arranged at the mixing zone for distributing an air flow between the air transmission branch and the air heating branch, wherein the mixing means are movable between an extreme hot position, in which the mixing means prevent communication between the air transmission branch and the mixing zone and force the air flow to pass through the air heating branch, an extreme cold position, in which the mixing means prevent communication between the air heating branch and the mixing zone and force the air flow to pass through the air transmission branch, and an extreme closed position, in which the mixing means prevent communication between the mixing zone and both the air transmission branch and the air heating branch, and wherein the mixing means comprise a butterfly flap pivotably mounted about a rotation axis arranged at the mixing zone, the butterfly flap comprising a first wing associated with one of the air transmission branch and the air heating branch including a first branch, and a second wing, associated with the other of the air transmission branch and the air heating branch including a second branch, as well as a wing extension elastically hinged to the first wing according to a hinge axis parallel to the rotation axis of the butterfly flap, wherein within the first branch there are arranged abutment means adapted to be engaged by the wing extension and to cause, during rotation of the butterfly flap, the wing extension to rotate relative to the first wing, and wherein, in the extreme closed position, the wing extension prevents communication between the first branch and the mixing zone, and the second wing prevents communication between the second branch and the mixing zone.

2. A device according to claim 1, wherein the first branch comprises a pair of opposing walls including a first wall and a second wall, wherein the abutment means comprise a first abutment formation arranged close to the first wall, and wherein in the extreme closed position, the wing extension engages the first abutment formation and the second wall.

3. A device according to claim 2, wherein in the extreme closed position, the wing extension also engages the first wall.

4. A device according to claim 2, wherein the abutment means comprise a second abutment formation arranged close to the second wall, and wherein in a position wherein the first wing closes the first branch, the wing extension is in abutment against the second abutment formation.

5. A device according to claim 1, wherein the wing extension is connected to the first wing through a hinge of elastomeric material.

6. A device according to claim 1, wherein the first wing and the second wing form with each other an angle of less than 180° with respect to the rotation axis of the butterfly flap.

* * * * *